July 24, 1956  G. H. FARRINGTON  2,755,813
DISCRIMINATING PNEUMATIC AMPLIFIER
Filed July 7, 1952  7 Sheets-Sheet 1

G. H. FARRINGTON 2,755,813

DISCRIMINATING PNEUMATIC AMPLIFIER

Filed July 7, 1952

Inventor:
George Howard Farrington
by Stevens, Davis, Miller & Mosher
his attorneys July 24, 1956

G. H. FARRINGTON 2,755,813

DISCRIMINATING PNEUMATIC AMPLIFIER

Filed July 7, 1952

Inventor
George Howard Farrington
by
Stevens, Davis, Miller & Mosher
his attorneys July 24, 1956 G. H. FARRINGTON 2,755,813
DISCRIMINATING PNEUMATIC AMPLIFIER
Filed July 7, 1952 7 Sheets-Sheet 7

Fig. 7.

United States Patent Office 2,755,813
Patented July 24, 1956

2,755,813

DISCRIMINATING PNEUMATIC AMPLIFIER

George Howard Farrington, Ilford, England, assignor to Ilford Limited, Ilford, England, a British company Application July 7, 1952, Serial No. 297,516

Claims priority, application Great Britain August 5, 1943

13 Claims. (Cl. 137—86)

This invention relates to the automatic control of a variable physical condition, such as temperature, pressure, speed and the like, by imposing corrective restraint on the value of the variable in relation to the detected deviation from a desired value which may be fixed or changing, and more particularly to the apparatus which determines the relationship between the deviation and the action which regulates the corrective restraint. The present application is a continuation-in-part of my earlier U. S. applications No. 561,002 and No. 546,564, filed on October 30, 1944, and July 7, 1944, respectively, both of which are now abandoned.

Such apparatus which is generally known as an automatic controller, is actuated by a sensitive element responsive to the value of the variable, and transmits to a regulating device, such as a valve, a signal which is derived from the response of the sensitive element. In this manner, it imposes on the value of the variable a corrective restraint which bears a predetermined relationship to its deviation from the desired value.

The relationship between the sensitive element response and the corrective restraint may be of various kinds, but where the relationship is continuous there are three basic forms. These forms are known as proportional, integral and derivative, and the corresponding relationships may be represented mathematically by:

Proportional: $\quad F_P = -\mu\theta$

Integral: $\quad F_I = -\gamma \int \theta dt$ i. e. $\dfrac{d\theta_I}{dt} = -\gamma\theta$ \hfill (i)

Derivative: $\quad F_D = -\rho\dfrac{d\theta}{dt}$ where:

$\theta$ = Deviation of the variable from the desired value.
$F_P, F_I, F_D$ = Corrective restraints.
$\mu, \gamma, \rho$ = Proportionality coefficients.

Each form has its own particular merits, which are well known to those versed in the art. The functions of the basic forms expressed in elementary terms are:

*Proportional.*—The corrective restraint is linearly proportional to the deviation of the controlled variable from the desired value. It is capable of reducing a deviation but it cannot eliminate it entirely.

*Integral.*—The corrective restraint increases at a rate which is proportional to the deviation of the controlled variable from the desired value. It is capable of eliminating the deviation completely but its performance is too slow for many applications.

*Derivative.*—The corrective restraint is proportional to the rate at which the controlled variable is changing. It is a rapid type of control but on its own it cannot keep a variable at a desired value. It must be used in conjunction with one or both of the other basic forms, in which case it displays most desirable properties.

Hence, for the best results it is often necessary to employ a relationship which combines more than one of these basic forms. In the majority of plants, machines and processes, the effect of the restraint imposed is subject to delay and attenuation, the nature of which depends in each particular case on the characteristics of the various stages through which the corrective restraint has to be transmitted. For this reason, the best results can only be obtained when the above-mentioned proportionality coefficients are adjusted to values which suit the particular plant, machine or process.

In cases where the proportional form is combined with the derivative or integral forms, the ratios $\rho/\mu$ and $\mu/\gamma$ each have the dimensions of time and have particular significance. The ratio $\rho/\mu$ can be described as the derivative action time and defined as the time-interval in which the proportional action increases by an amount equal to the derivative action when the deviation is changing at a uniform rate.

The above-mentioned controller signal may be transmitted by regulating the pressure of a source of fluid supply and, in cases where the corrective restraint combines two or more of the basic forms, the regulated pressure has the corresponding components. The known means employed in this method for regulating derivative and integral components involve direct dependence on the proportional component. In the derivative case, these means comprise a resistance-capacitance negative feedback which includes a small adjustable needle-valve. The pressure of the source of fluid supply is regulated so as to maintain proportionality between the deviation of the variable and the pressure on that side of the needle-valve which is remote from the source of fluid supply (i. e. the downstream side) or, alternatively, proportionality in part with the deviation and in part with a time-integral of the deviation. There is thus produced across the needle-valve a pressure difference which is proportionate to the rate of change of the downstream pressure. This pressure difference determines the derivative component and in the regulated pressure it is added to the pressure on the downstream side of the needle-valve. The adjustment of the needle-valve determines the ratio $\rho/\mu$. It also determines the time-constant of the resistance-capacitance negative feed-back and, in the known means, this time-constant is either equal to or nearly equal to $\rho/\mu$.

The above-mentioned means can only operate as described provided that the value of the upstream pressure needed does not go beyond the limits of the available range of the regulated source of fluid supply. If one of these extremes is reached, the apparatus is said to be over-ranged. The pressure on the downstream side does not then change at the requisite rate and the required response is no longer generated. This over-ranging can more readily take place when the needle-valve is adjusted to give a high value of the above-mentioned time-constant, as the pressure difference which corresponds to any given rate of change is then increased. Furthermore, although the deviation may only momentarily change at a rate sufficient to over-range the apparatus, the latter does not immediately recover from the over-ranging but only does so after an interval, the length of which depends upon the needle-valve time-constant. I have found that the optimum values of $\rho$ and $\mu$ in many control applications can only be obtained with these means by adjusting this time-constant to a value which, as a result of a sudden change in the deviation of the variable from the desired value (a change which may for instance be caused by a sudden change in the desired value itself), is large enough to cause the apparatus to be over-ranged for more than 20 seconds. As a consequence, excessive restraint is imposed which disturbs the control system and defeats the object of the control apparatus. A further disadvantage which results from adjusting the needle-valve to give a high time-constant is that it can lead to instability and continuous oscillation in the apparatus itself.

Means have been disclosed which comprise a partial by-passing of the derivative restriction. This by-pass overcomes the difficulties described above but, at the same time, prevents the apparatus from generating the true derivative form, which form I have found to be essential if the best control results are to be obtained. It is an object of the present invention to provide means whereby high values of the $\rho/\mu$ ratio can be obtained without a correspondingly high needle-valve time-constant and without destroying the true form of the required derivative relationship. This is achieved by applying a discriminating amplification to the derivative component so that it is magnified in relation to the proportional form from which it is originally generated. The value of the time-constant referred to above can then be correspondingly reduced. Furthermore, by thus ensuring the production of a true derivative response, it becomes possible to generate a 2nd time-differential from the 1st time-differential and so produce a 2nd derivative form, which form I have found to be of advantage in some applications.

Figure 1:
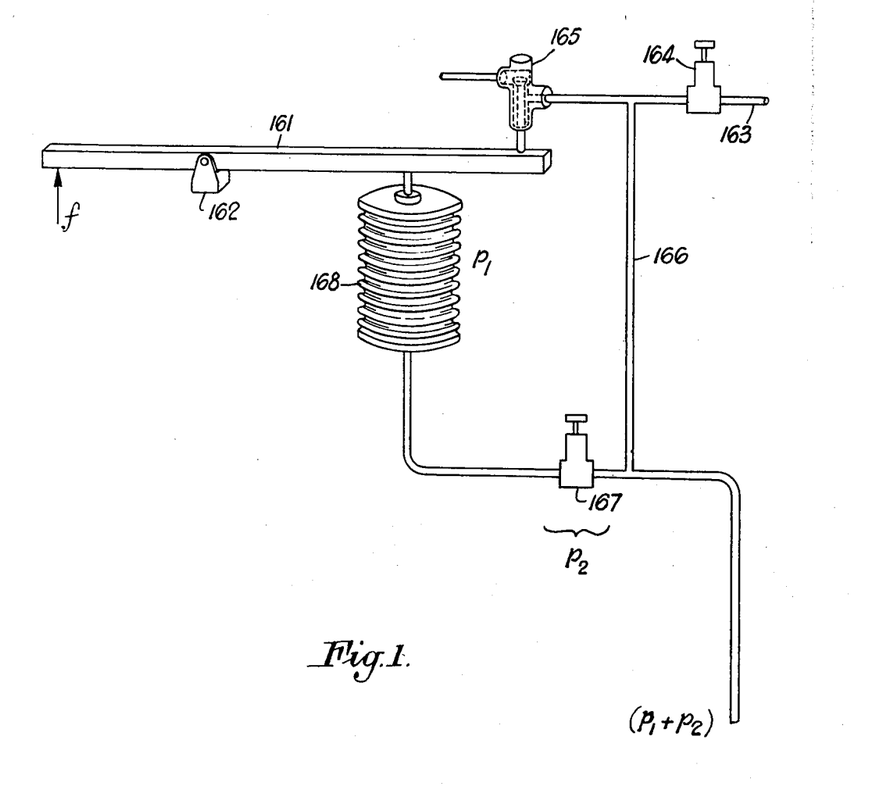
Figure 1 shows the pneumatic means described in British Patent No. 536,537, for producing a derivative response.

Referring to Figure 1, a movable member 161 is pivoted at 162 and is subjected to the opposing moments exerted by the force $f$ and the pressure sensitive capsule 168. A compressed air supply 163 is connected through the restriction 164 to the air line 166 and to the leak valve 165. The leak valve 165 regulates an escape of air, and in co-operation with the restriction 164, regulates the air pressure in the air line 166. The capsule 168 is connected to the air line 166 through the needle-valve 167. The movable member 161 is arranged to operate the leak valve 165 in such a manner that the pressure in the air line 166 is reduced when the movable member 161 moves towards the leak valve 165. Consequently, an increase in the air pressure in the capsule 168 tends to lower the pressure in the air line 166, and an increase in the force tends to raise it. The force $f$ is regulated, by control apparatus not shown, in such a manner that with a mid-value as datum its value is proportional to the deviation of a variable from the desired value.

The leak valve 165 is so designed that a small displacement of the movable member 161 is sufficient to produce the full range of the regulated air pressure. Moreover, the stiffness of the capsule 168 and the effort required to operate the leak valve 165 are also small. Consequently, a small change in the net moment applied to the movable member 161 is sufficient to regulate the air pressure over the full range. Hence, but for the consequent change of pressure in capsule 168, a small change in the value of the force $f$ would produce a comparatively large change in the pressure in the air line 166.

The pressure in the capsule 168 is affected by the air flowing through the needle-valve 167 and an increase of pressure in the air line 166, resultant on an increase in the value of the force $f$, produces an increase in the air pressure $p_1$ in the capsule 168. Consequently the capsule 168 exerts an increased moment on the movable member 161 and operates as a "follow-up" or "negative feedback." This additional moment counteracts that due to the increase in the value of the force and considerably reduces the pressure increase which would otherwise take place in the air line 166. The movable member takes up a position at which the corresponding pressure in the air line 166 produces a pressure in the capsule 168 such that the counteracting moment exerted by the capsule is in equilibrium with that exerted by the force $f$. In view of the small moment required to operate the leak valve 165, it follows that the pressure $p_1$ in the capsule 168 is substantially proportional to the force $f$, and consequently varies in proportion to the deviation of the variable from the desired value, even though the characteristic of the leak valve may be non-linear.

So long as the force $f$ remains constant, i. e. so long as the deviation of the variable remains constant, the pressure in the capsule 168 will also be constant and will be equal to the pressure in the air line 166. If, on the other hand, the force $f$ increases, the pressure in the capsule 168 must be increased correspondingly in order to maintain equilibrium. In order to raise the pressure in the capsule 168, a proportionate amount of air has to enter and this involves air-flow through the needle-valve 167. Accordingly, the appropriate pressure difference $p_2$ has to be maintained across the needle valve 167 by raising the pressure in the air line 166. In the preferred design of needle-valve the rate of air-flow is substantially proportional to the pressure difference across it. As the rate of air-flow into the capsule 168 determines the rate at which the pressure $p_1$ changes, it follows that the rate of change of $p_1$ is substantially proportional to the pressure difference $p_2$. Moreover, as $p_1$ is proportionate to the deviation of the variable, $p_2$ is proportionate to the rate of change of the deviation.

The proportionality between $p_2$ and $dp_1/dt$ depends on the product of two factors: (a) the quantity of air required to change the pressure in the capsule 168 by unit amount, i. e. the "capacitance" C and (b) the pressure difference required across the needle-valve 167 to produce unit rate of air-flow, i. e. the "resistance" R. The factor (a) is dependent on the volume of the apparatus connected to the downstream side of the needle-valve, i. e. the volume of the capsule and piping, the pressure being raised by 1 atmosphere when the quantity of air which has entered would have this volume in the free state. The factor (b) is dependent on the needle-valve adjustment. Expressed mathematically the relationship between $p_1$ and $p_2$ is given by:

$$\frac{dp_1}{dt} = \frac{1}{RC} \cdot p_2 \qquad (\text{ii})$$

Thus the coupling of the needle-valve 167 to the capsule 168 forms a "resistance-capacitance" (RC) circuit and exhibits the known behaviour of such circuits. The product RC has the dimensions of time and constitutes the time-constant T which is a characteristic of RC circuits.

Figure 2:
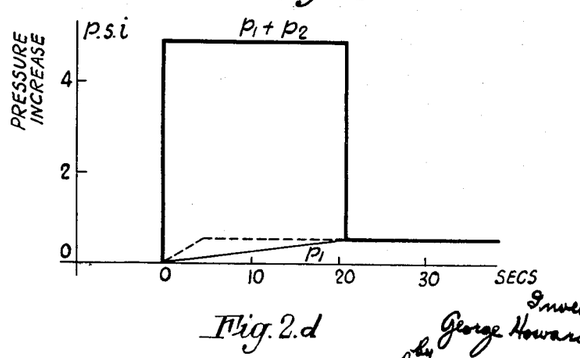
Figures 2a through 2d illustrate response curves referring to the means shown in Figure 1.
Figures 2A, 2B:
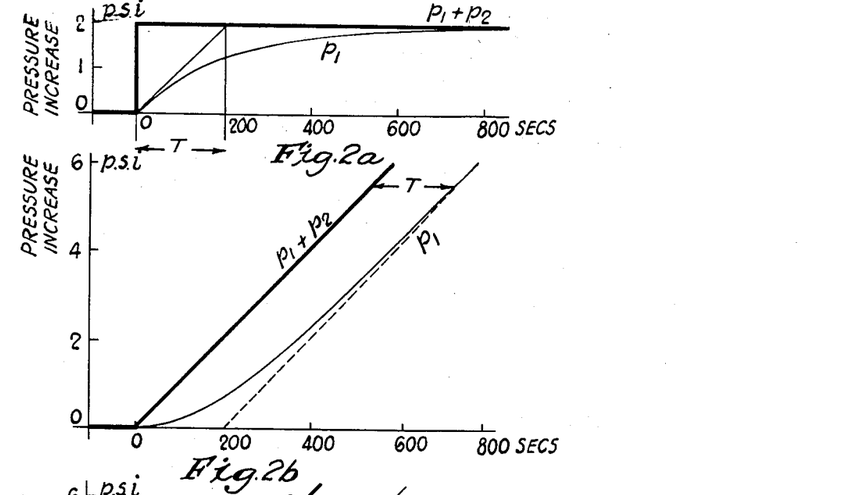

For instance, if the pressure difference $p_2$ is initially zero and the pressure in the air line 166, which is $(p_1+p_2)$, is suddenly raised to a new value, the response of the downstream pressure $p_1$ is exponential. This response is exemplified in Figure 2, curve (a), the increase in the value of $(p_1+p_2)$ being 2 p. s. i. The value of the time-constant T is 200 seconds, a value which is representative of those required in many control applications. The initial rate of change of $p_1$ is equal to the increase in the value of $(p_1+p_2)$ divided by T, i. e. 0.01 p. s. i./sec.

Alternatively, if the upstream pressure $(p_1+p_2)$ increases continuously at a uniform rate, $p_2$ again being initially zero, the downstream pressure $p_1$ lags behind ($p_1+p_2$) by a time-interval which increases and eventually approaches the value of T. At the same time the rate of increase of $p_1$ rises and approaches that of ($p_1+p_2$). This response is exemplified in Figure 2, curve (b), the rate of increase of ($p_1+p_2$) being 0.5 p. s. i./sec. and the value of T again being 200 seconds.

Figure 2C:
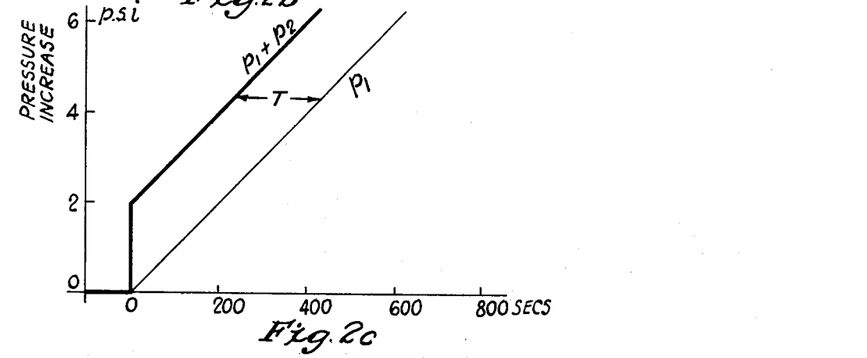

By adding these two curves to form Figure 2, curve (c), an example is obtained which corresponds to the case in which the deviation begins to change at a rate which demands that $p_1$ shall increase at the uniform rate of 0.01 p. s. i./sec. In order to achieve this response, ($p_1+p_2$) must immediately increase by 2 p. s. i. and thereafter continue to increase at the rate of 0.01 p. s. i./sec. The consequent pressure difference $p_2$ across the needle-valve 167 is 2 p. s. i. and is equal to the rate of change of $p_1$ multiplied by T. Similarly, it can be shown that for any other behaviour of the deviation the requisite value of ($p_1+p_2$) will produce the requisite values of $p_1$ and $p_2$.

The above described response will be obtained provided that the regulation of the leak valve 165 resultant on the net moment exerted by the force and the capsule 168 does produce the requisite value of ($p_1+p_2$) in the air line 166. However, the performance of the leak valve and the operating mechanism is subject to certain inherent limitations which can prevent the production of the desired pressure. These limitations determine the range of pressure which can be produced and the maximum rate at which the pressure can be changed. As the required range of ($p_1+p_2$) and the rate at which it should change become proportionately higher when the value of T is increased, the apparatus fails to discharge its intended function if the value of T is sufficiently high.

If the required value of ($p_1+p_2$) is beyond the range of pressure which can be produced by the leak valve 165, the pressure in the air line 166 does not bring $p_1$ immediately to its proper value. Accordingly the pressure ($p_1+p_2$) is held at the limited value until $p_1$ reaches the value demanded by the deviation. The consequent response is exemplified in Figure 2, curve (d), which represents the case in which the deviation suddenly begins to change at a rate which demands that $p_1$ shall increase at the uniform rate of 0.125 p. s. i./sec. and in which the deviation increases for 4 seconds only. The value of T is again taken as 200 seconds and accordingly the required value of $p_2$ is 200 multiplied by 0.125, i. e. 25 p. s. i. In this example it is assumed that the available increase of pressure which the leak valve can produce is limited to 5 p. s. i. Consequently the pressure ($p_1+p_2$) is increased by this amount until the pressure $p_1$ reaches the value demanded by the deviation, which value is shown in dotted line on the curve. This does not take place until over 20 seconds have elapsed, i. e. 5 times the period during which the deviation actually changes. Hence the desired relationship between the deviation and the corrective restraint is not maintained and the control system subjected to a disturbance which has a disadvantageous effect on the value of the variable.

When at any time the pressure $p_1$ reaches the value demanded by the deviation, the moment exerted by the capsule 168 becomes sufficient to regulate the pressure ($p_1+p_2$) by operating the leak valve. However, the rate at which the pressure is changed is subject to the abovementioned limitation and consequently, although the deviation may be unchanging, the pressure difference $p_2$ does not immediately become zero. Accordingly the pressure $p_1$ continues to change and thus over-reaches the value demanded by the deviation. This causes ($p_1+p_2$) to be brought to a value which reverses $p_2$ and as a consequence the tendency of $p_1$ is reversed. With a sufficiently high value of T, a continuous oscillation (known as "hunting" or "pumping") is set up in this manner, even though the deviation remains constant.

The pressure ($p_1+p_2$) in the air line 166 is employed to regulate proportionately a combined corrective restraint comprising the proportional and the derivative forms. Substituting T for RC, Equation (ii) can be restated as:

$$p_2 = T \frac{dp_1}{dt} \quad \text{(iii)}$$

and hence:

$$(p_1+p_2) = p_1 + T \frac{dp_1}{dt} \quad \text{(iv)}$$

As ($F_P+F_D$) is proportionate to ($p_1+p_2$) and $p_1$ is proportionate to $\theta$, it follows from Equation (i) that $T=\rho/\mu$. Hence these means can only produce the values of $\rho$ and $\mu$ required in any particular control application by the needle-valve 167 being adjusted to give $T=\rho/\mu$. (In the means shown in British Patent No. 536,537, additional means are included for producing and combining a further pressure which has a time-integral relationship to the deviation but the above relationship between $p_1$ and $p_2$ is retained in the combined pressure which is employed to regulate the corrective restraints.) I have found that the resulting value T in many control applications is high enough to cause the above-described imperfect operation.

The invention provides means for overcoming the above-described limitations. These means consist of a discriminating pneumatic amplifier which, for example, when employed in combination with the apparatus shown in Figure 1, generates a pressure consisting of $p_1$ plus a multiplication of $p_2$. Thus, if this multiplication is, say, ten times, it becomes possible to reduce $p_2$ and hence T to one-tenth of the value which would otherwise be required.

Figure 3:
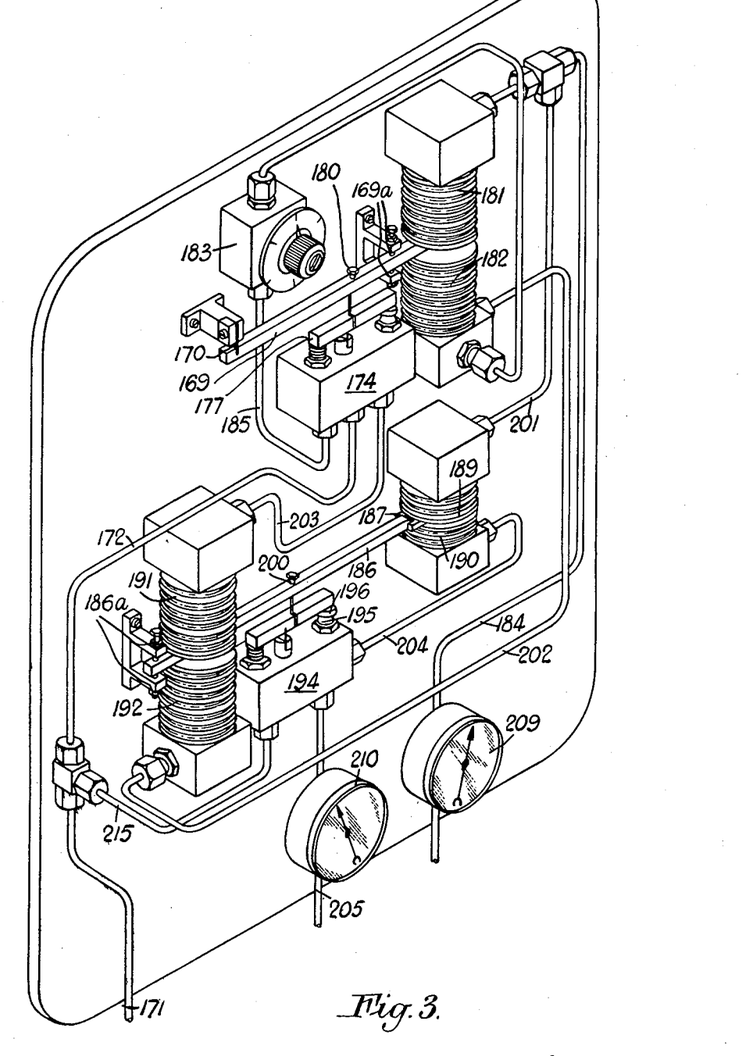
Figure 3 shows a perspective view of pneumatic apparatus, incorporating the preferred embodiment of the invention, for generating a derivative response.
Figure 4:
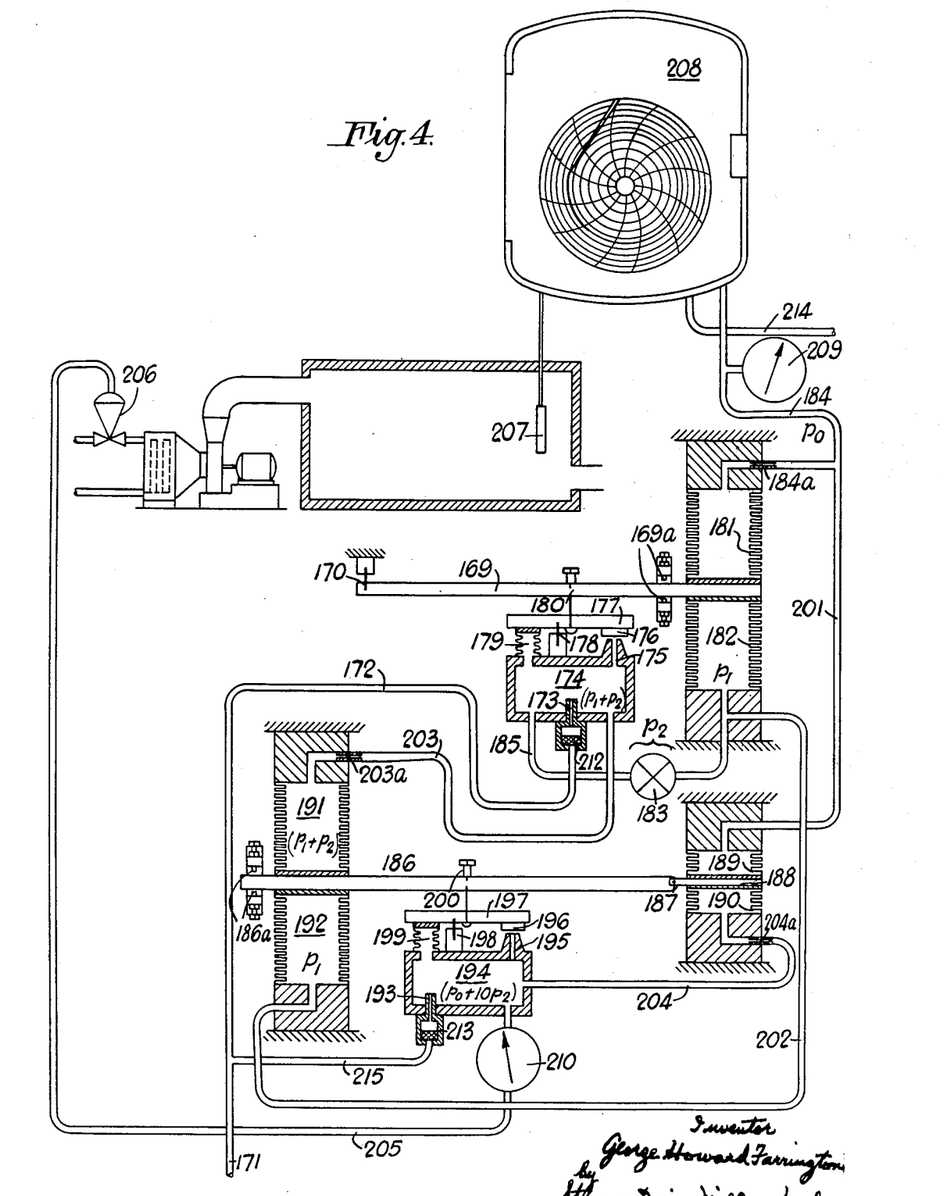
Figure 4 shows a diagrammatic view of the apparatus of Figure 3 operating in conjunction with a temperature controller.
Figure 5B:
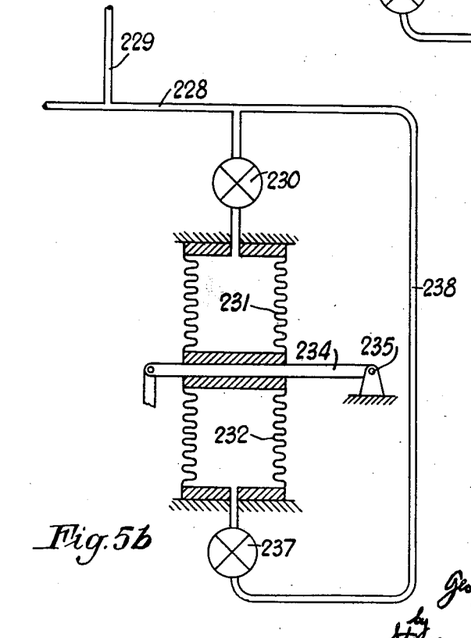
Figure 6:
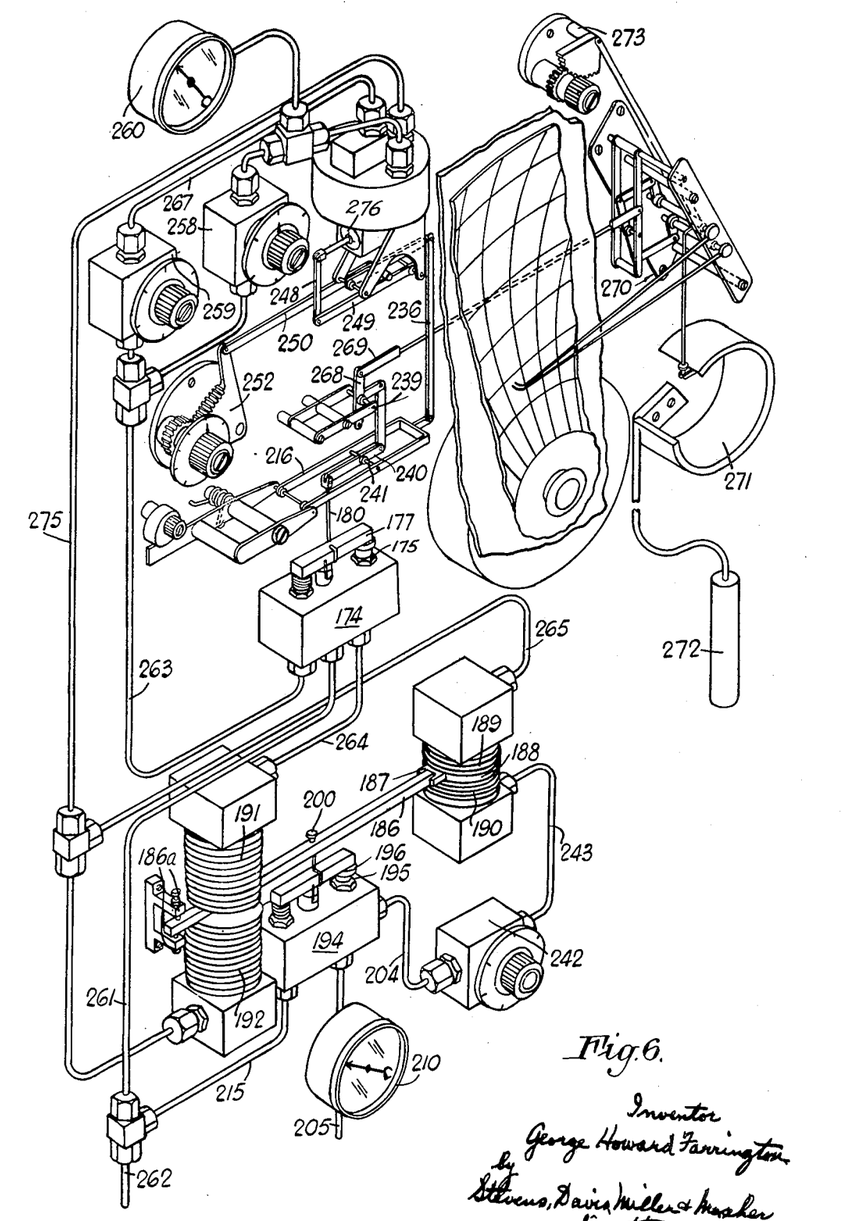
Figure 6 shows a perspective view of an automatic controller, incorporating the preferred embodiment of the invention, which produces combined proportional, integral, 1st derivative and 2nd derivative action.
Figure 7:
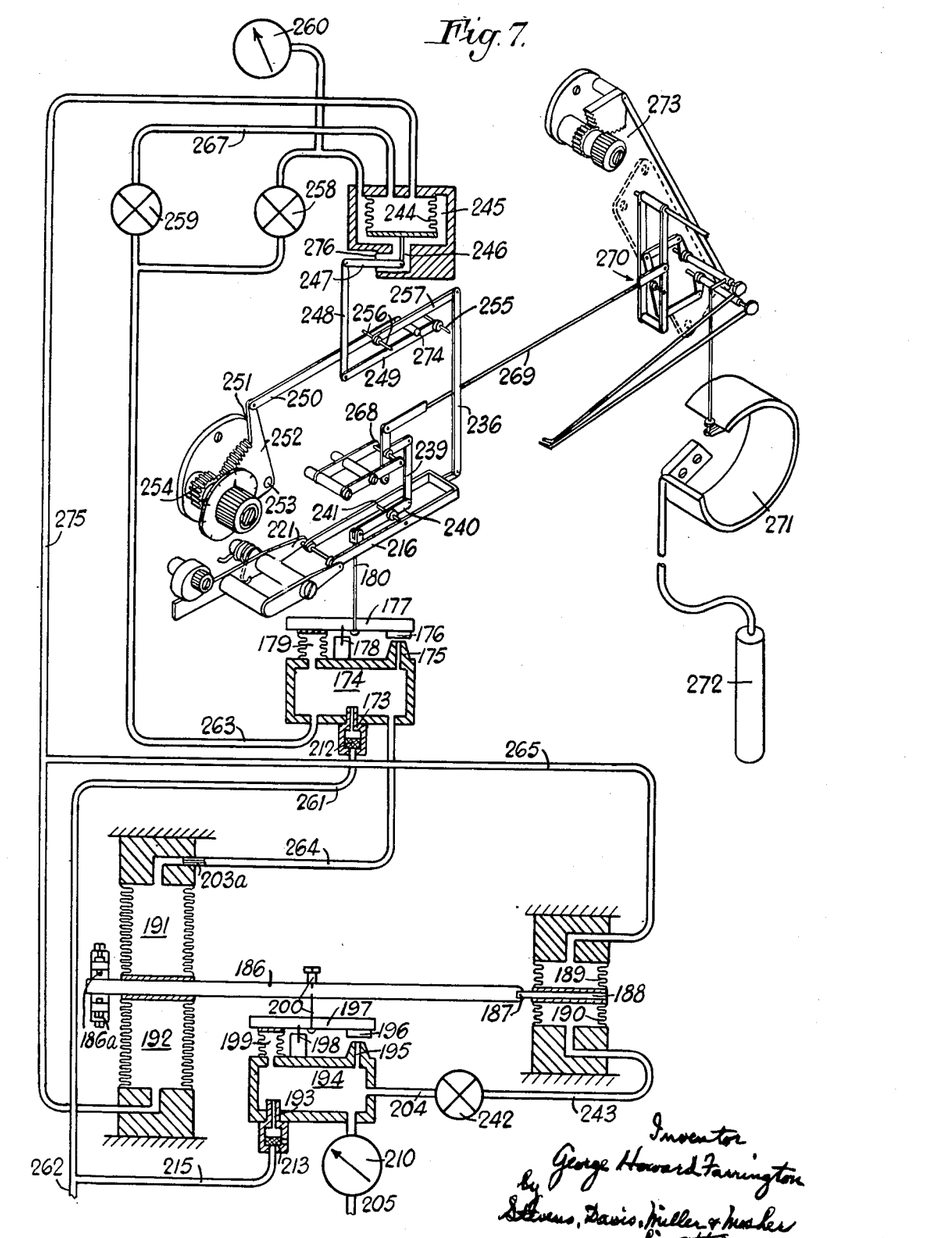
Figure 7 is a diagrammatic view of the apparatus of Figure 6.

The preferred embodiment of the invention is incorporated in Figures 3, 4, 6 and 7, and consists of a pneumatic balance comprising the lever 186, the capsules 189, 190, 191 and 192 and an air valve, whereby the pressure in the air chamber 194 is governed by the pallet 196 which permits air to escape through the jet 195. Thus, the chamber 194 and associated linkages define a valve means for regulating the pneumatic pressure in the air line 205. In Figures 3 and 4 the pressures applied to the pneumatic balance are provided by means similar to those shown in Figure 1. In Figures 6 and 7 they are produced by means similar to those shown in Figure 5(b).

The preferred embodiment of the invention will now be described. Referring to Figures 3 and 4, the capsules 191 and 192 are attached to opposite sides of the lever 186 which is pivoted at 187 and exert equal and opposing moments about the pivot 187 per unit pressure applied to them. Capsules 189 and 190 are attached to opposite sides of the flat bar 188 and exert equal and opposing efforts per unit pressure applied to them. The flat bar 188 is arranged to form a lug which carries the pivot 187. The adjustable pull-rod 200 is attached to the lever 186 at a point in the centre section. The stops 186a serve to prevent excessive displacement of the lever 186.

A pressure difference between the capsules 191 and 192 produces a substantially proportionate vertical displacement of the pull-rod 200 amounting to approximately 0.02" per 1 p. s. i. pressure difference. A pressure difference between the capsules 189 and 190 similarly produces a substantially proportionate vertical displacement of the pull-rod 200 but amounting only to approximately 0.002" per 1 p. s. i. pressure difference.

The adjustable pull-rod 200 is also attached to the lever 197, which is pivoted by the flexing strip 198, and transmits the movement of lever 186 to lever 197. A compressed air supply 171 is connected by the air line 215, the air filter 213 and the constriction 193 to the air chamber 194. Escape of air from the air chamber 194 through jet 195 is regulated by the pallet 196, which in co-operation with the constriction 193 regulates the pressure in the air chamber 194. The jet 195 has a diameter of $\frac{3}{16}$" and the annulus or "land" at the mouth of the jet is about 1/32". The land of jet 195 is machined so that it is perfectly flat and the pallet 196 is an optically flat glass disc which is set in a thermoplastic material (such as "Perspex") held in a metal cup attached to the lever 197. In the manufacture, the pallet is originally aligned with the jet by heating the thermoplastic and then bringing the pallet and jet into contact. The pallet 196 is attached to the lever 197 which is pivoted by the flexing strip 198. The lever 197 is subjected to the moment exerted by the pressure-sensitive capsule 199, which capsule is connected to the air chamber 194. The air pressure in the air chamber 194 exerts an effort on the pallet 196 and consequently, exerts a moment on the lever 197 about the flexing strip 198. This moment is opposed by the moment exerted by the capsule 199 which is subjected to the same pressure as the pallet. The capsule 199 is located at a selected distance from the flexing strip 198 so that the moment which it exerts on the lever 197 balances the moments exerted on pallet 196 and also compensates for the effort required to overcome the stiffness of the capsules 189, 190, 191 and 192 when the lever 186 is moved. It will now be evident that each of the capsules 189, 190, 191 and 192 contributes motive force to deflect the lever 186. Moreover, the capsules 189, 190, 191 and 192, operating as motor means on lever 186, are responsive to both the proportional and derivative components. The capsule 199 is sufficiently compressed so that, when released by pull-rod 200, it is capable of closing the pallet and jet against the full supply pressure. A pressure change in the air chamber 194 from 3 to 15 p. s. i., when the air supply 171 is 17 p. s. i., is produced for a movement of the pallet 196 of about 0.002". The pressure in the air chamber 194, which is indicated by the pressure gauge 210, is employed as a "control-line pressure" to regulate a corrective restraint on the controlled variable. In the apparatus shown in Figure 4, this corrective restraint is effected by the diaphragm valve 206 which regulates the steam supply to a heater and which is connected to the air chamber 194 by the air line 205. The heater is employed to heat the air which is supplied by a fan to the chamber in which the temperature-sensitive element 207 is situated. As will become evident from the following description, the chamber 194 and associated mechanism comprise a novel fluid or pneumatic pressure operated means for applying a discriminating amplification to the diaphragm valve 206, and modulating, via the heater, the corrective restraint thus effected in proportion to the algebraic sum of the proportional and amplified derivative components. Thus, each time that the temperature sensed by element 207 changes from the preset value, the valve 206 operates on the steam supply to the heater to "follow-up" the deviation with the appropriate correctional action. Thus follow-up action which is effected by valve 206 may, of course, comprise either an increase or decrease in the supply of heat to the chamber, depending upon the sense of the deviation.

The capsules 191 and 192 are connected respectively by air lines 203 and 202 to apparatus of the type described in British Patent No. 536,537 and shown in Figure 1. Referring to Figures 3 and 4, this apparatus comprises capsules 181 and 182 which are attached to opposite sides of the lever 169 which is pivoted by means of the flexing strip 170. Capsules 181 and 182 exert equal and opposing moments about the flexing strip 170 per unit pressure applied to them. The stops 169a serve to prevent excessive displacement of the lever 169. The pull-rod 180 is attached to lever 169 at a point in the centre section and transmits the displacement of the lever 169 to a compensated jet and pallet unit of the type described above and comprising lever 177, flexing strip 178, air chamber 174, jet 175, pallet 176, capsule 179, air supply line 172, air filter 212 and constriction 173.

Capsule 182 is connected through needle valve 183 and air line 185 to the air chamber 174. The air chamber 174 is connected by the air line 203 and constriction 203a to the capsule 191. Capsule 182 is connected by air line 202 to capsule 192. Referring to Figure 4, capsule 181 is connected through constriction 184a and air line 184 to an air-operated recording temperature controller 208 which has a temperature-sensitive bulb 207 and is connected to a source of air pressure by the air line 214. The air line 184 is also connected by the air line 201 to the capsule 189. Pressure gauge 209 indicates the pressure in the air line 184.

Capsule 191 is connected by air line 203 to the air chamber 174 which is directly connected by air line 185 to one side of the needle valve 183. Capsule 192 is connected by air line 202 to the other side of the needle valve 183. Hence, the pressure difference between the capsules 191 and 192 is the pressure difference which occurs across the needle valve 183.

In comparison with the apparatus shown in Figure 1, the effort exerted by the bellows 131, shown in Figures 3 and 4, represents the force $f$ and is regulated by the recording temperature controller 208 in such a manner that, with a mid-value as datum, its value is proportionate to the deviation of the temperature of bulb 207 from the desired value. The pressure in the capsule 182 corresponds to $p_1$ and the pressure difference across the needle valve 183 to $p_2$. Consequently, the pressure in the capsule 182 is proportionate to the temperature deviation and the pressure difference across the needle valve 183 is proportionate to the rate of change of the temperature. The needle valve 183 thus establishes a response to deviations in the variable condition which consists of a pressure component $p_2$ proportional to the rate of change of temperature sensed by bulb 207. The method of utilizing this second response, along with a first response related to deviation, per se, will become clear as the description proceeds. More particularly, the bulb 207 in Figure 4 along with the recording temperature controller 208 continuously detect deviations and establish a first response related thereto within the capsule 182, in which the pressure $p_1$ comprises a component proportional to the variable condition.

Referring now to the operation of the pneumatic amplifier, the pull-rod 200 is adjusted so that, with zero pressure difference between the capsules 191 and 192, the air escape from the jet 195 is regulated to an amount which, in conjunction with the constriction 193, brings the pressure in the capsule 190 to equality with the pressure in the capsule 189. If the pressure applied to capsule 189 then increases, the pivot 187 and consequently the pull-rod 200 are displaced downwards, thus allowing the pallet 196 to approach the jet 195 and to reduce the quantity of air escaping. The resultant rise of pressure in the air chamber 194 increases the pressure applied to the capsule 190 and constitutes a "negative feed-back" of the type described in connection with Figure 1. Consequently, with zero pressure difference between capsules 191 and 192, the pressure in the capsule 190 is maintained in equality with that applied to capsule 189. As capsule 189 is directly connected to the output line 184 of the temperature controller 208, the pressure $p_0$ applied to it is proportionate to the deviation of the temperature from the desired value. Consequently, changes in the pressure applied to capsule 190 resultant on changes in the pressure applied to capsule 189 have the same proportionality to the deviation of the temperature from the desired value and constitute the proportional component of the control line pressure.

If the temperature is changing, there will be a proportionate pressure difference across the needle valve 183 and accordingly between the capsules 191 and 192. This pressure difference will cause an additional displacement of the pull-rod 200, the sense depending on the sign of the pressure difference, and the negative feed-back produced by the action of the capsule 190 will again so regulate the air pressure in the air chamber 194 that equilibrium is maintained. However, in view of the fact that the displacement of the pull-rod 200 consequent on unit change in the pressure applied to capsule 190 is approximately one-tenth of that consequent on unit change in the pressure difference applied to capsules 191 and 192, it follows that the resultant pressure change in capsule 190 will be approximately ten times the pressure difference between capsules 191 and 192, which pressure difference is proportionate to the rate-of-change of the temperature. Consequently, the pressure in the capsule 190 includes a derivative component which is proportionate to the rate-of-change of the temperature and has a proportionality ratio which is ten times that borne by the pressure difference across the needle valve. This component constitutes the derivative component of the control line pressure. Thus, the portion of the system which includes the pressure sensitive capsules 189 and 190 acting in conjunction with the lever 186 and chamber 194 comprises a means for applying a discriminating amplification to derivative component. Moreover, by virtue of the discriminating amplification provided it becomes possible to obtain a given value with the needle valve adjusted to give a time constant T of one-tenth the value which would be required if the pneumatic amplifier was omitted.

The constrictions 184a, 203a and 204a, in conjunction with the volumes of capsules 181, 191 and 190 constitute filters of the resistance-capacity type. These filters are not essential but they serve to attenuate the parasitic pressure changes which may occur, and to minimise their effects on the capsules 181, 191 and 190. These parasitic pressure changes are commonly found to be of a transient nature having periods of not more than one or two seconds, whereas in the automatic control of process plants the normal periods lie between four and twenty minutes. Accordingly, the time constants of the combinations consisting of the constrictions and the volumes are preferably arranged to be about 1.5 seconds with the result that the amplitudes of the parasitic frequencies are effectively reduced with negligible effect on the comparatively low frequencies of the controlled process. Consequently, with the exception of the parasitics the pressure in capsule 181, and hence that in capsule 182, is equal to the pressure $p_0$ in the air line 184. Similarly the pressure in the capsule 191 is equal to pressure in the air chamber 174, and the pressure in the capsule 190 is equal to the pressure in the air chamber 194. It is accordingly admissible to connect the capsule 189 to capsule 182 and to omit the air line 201. Substantially the same results are obtained with this alternative arrangement.

In most control applications, a relative derivative amplification ratio of ten is sufficient to overcome the limitations described in connection with the means shown in Figure 1. In other cases it may be necessary to arrange the amplifier to give a greater ratio. This can be achieved without impairing its operation.

It is usually desirable to include the integral form in the corrective restraint, as this form tends to reduce the deviation to zero and compensates for load changes to which the controlled plant may be subjected.

Means of this type can be operated in conjunction with the apparatus shown in Figures 3 and 4, by utilizing the pressure $p_0$ as the input to the integral unit and subjecting the capsule 189 to its output pressure. This is achieved by omitting the air line 201, by connecting the air line 184 to the input side of the integral unit and by connecting the output side to the capsule 189. The pressure in the air chamber 194 can then be employed to regulate a combined corrective restraint which will comprise the proportional, integral and derivative forms. The above-described generation and amplification of the derivative response is unimpaired. Moreover, the ratio $p/\mu$ is unaffected by the integral needle valve adjustment.

Alternatively, the proportional controller 208 could be replaced by a proportional plus integral controller. Such a controller would regulate the pressure in the air line 184 proportionately to the algebraic sum of two components, one varying in proportion to the deviation and the other in proportion to the time-integral of the deviation, the relative proportion of the integral component being determined by the adjustment of a needle valve included in the controller. The apparatus shown in Figures 3 and 4 can then be employed without alteration and the pressure in the air chamber 194 will include an integral component in addition to the proportional and derivative components.

Figure 5A:
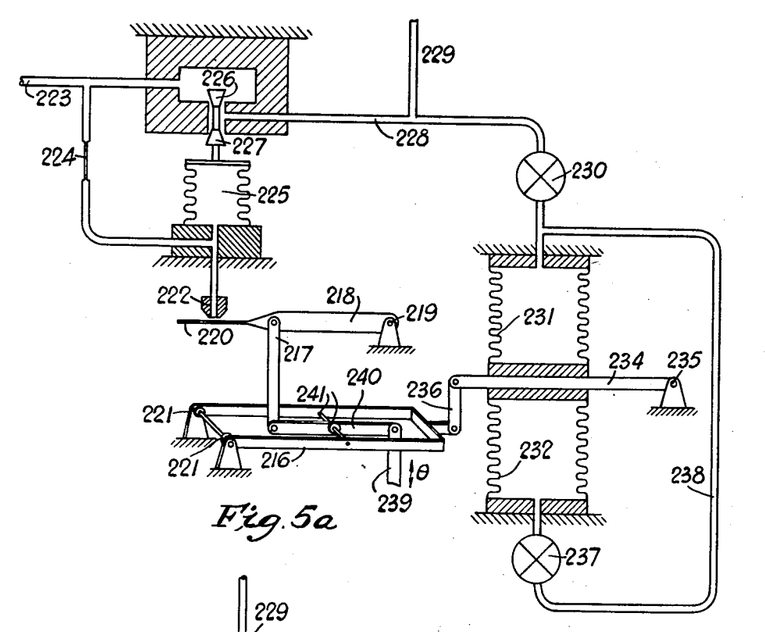
Figures 5a and 5b show known pneumatic means for producing combined proportional, derivative and integral action, responsive to the deviation of a variable from the desired value.

In addition to the above-mentioned air-operated proportional and proportional plus integral controllers, other controllers are available which regulate a pressure comprising proportional, integral and derivative components. The means customarily employed are represented diagrammatically by the alternatives shown in Figures 5(a) and 5(b). Referring to Figure 5(a), the deviation of the value of a variable from a desired value is detected by means not shown and the link 239 is moved upwards and downwards in proportion to the deviation. The link 239 is connected to one end of the arm 240 which is centrally pivoted at 241 and is connected at the other end by the link 217 to the flapper arm 218 which is pivoted at 219. A compressed air supply 223 is connected through the constriction 224 to the capsule 225 and to the escape jet 222. The escape of air from the jet 222 is regulated by the flapper 220 which is attached to the flapper arm 218. The jet diameter is customarily about 0.02″, the air flow is comparatively small and the regulated range of air pressure is a fraction of that required to regulate the corrective restraint. The reactive load on the flapper 220 is thus minimised but a pressure amplifier has to be provided. This amplifier consists of the capsule 225 which operates the valves 226 and 227 which serve to regulate the pressure in the air line 228.

The arm 234 is pivoted at 235 and is attached at the other end by the link 236 to one end of the rigid frame 216 which is pivoted at 221. The rigid frame 216 carries the pivots 241. Consequently a displacement of the arm 234 displaces the pivots 241 and transmits movement to the flapper arm 218. Accordingly the arrangement forms a differential linkage and the displacement of the flapper arm 218 represents the net displacement due to the arm 234 and to the link 239.

The opposing capsules 231 and 232, which exert equal efforts per unit pressure, are attached to the arm 234 with the result that the displacement of the arm 234 is proportionate to the pressure difference between the capsules 231 and 232. The air line 228 is connected through the adjustable needle valve 230 to the capsule 231. The capsule 232 is connected through the adjustable needle valve 237 to the air line 238 which is connected to the capsule 231 and hence to the downstream side of the needle valve 230.

A downward movement of the link 239 raises the flapper arm 218 so that the flapper 220 approaches the jet 222 and reduces the escape of air. Consequently the pressure rises in the capsule 225 with the result that the valve 227 is closed and the valve 226 is opened. Hence the pressure in the air line 228 tends to rise to that of the compressed air supply 223. Consequently a pressure difference is produced across the needle valve 230 and the resultant air flow raises the pressure in the capsule 231. The increase of pressure in the capsule 231 lowers the link 234 and consequently the pivots 241, thus lowering the flapper arm 218 and tending to lower the pressure in the air line 228. Hence capsule 231 serves to operate a follow-up (i. e. negative feed-back) and, due to the small movement of the flapper 220 which is sufficient to regulate the presure in the air line 238, the pressure difference between the capsule 231 and 232 varies substantially in proportion to the deviation $\theta$.

The provision of the needle valve 230 establishes a resistance capacity circuit so that the follow-up action of the capsule 231 constitutes a "resistance capacity negative feed-back." Conversely the action of the capsule 232 which is opposed to that of the capsule 231, constitutes a positive feed-back and the provision of the needle valve 237 establishes a resistance capacity circuit so that the follow-up action of the capsule 232 constitutes a "resistance capacity positive feedback." The rate of change of the pressure in the capsule 232 is proportionate to the pressure difference across the needle valve 237, which pressure difference, being that between the capsules 231 and 232, varies in proportion to the deviation. Consequently the pressure in the capsule 232 is proportionate to the time-integral of the deviation and constitutes the desired integral component. Hence the pressure in the capsule 231 comprises the algebraic sum of the proportional and integral components.

The flow through the needle valve 230, which is proportionate to the pressure difference across it, comprises the flow through the needle valve 237 as well as the flow associated with the capsule 231. Consequently the pressure difference across the needle valve 230 is proportionate to the rate of change of the pressure in the capsule 231 plus the pressure in the capsule 232, the sum of which pressures comprises the proportional component plus twice the integral component. Hence the pressure difference across the needle valve 230 contains the derivative component and the pressure in the air line 228, which is transmitted by the air line 229 and employed to regulate the corrective restraint, comprises a proportional, integral and derivative component. As the pressure difference across the needle valve 230 also contains a proportional component derived from twice the integral components, the derivative action time $\rho/\mu$ is again not entirely determined by the time-constant associated with the derivative needle valve 230 but is also dependent on the time-constant associated with the integral needle valve 237. The actual relationship in this case is given by:

$$\frac{\rho}{\mu} \frac{T_D : T_I}{2 T_D + T_I} \qquad (v)$$

I have found that, with the values of $T_I$ required in most control applications, the values of $T_D$ have to be increased nearly four times due to this interaction. Furthermore it is not possible to reduce the ratio of the integral action time to the derivative action time in this case to a value less than 8, a limitation which prevents the optimum values of the proportionality coefficients being obtained in many control applications. As a consequence it is customary to employ a lower value of $\rho$, with the result that the derivative form of corrective restraint is not employed to good advantage.

Figure 5(b) shows a modification of the arrangement shown in Figure 5(a) in which the air line 228 is directly connected to the needle valve 237 by the air line 238 and the connection between the air line 238 and the capsule 231 is omitted. Thus the needle valve 237 is connected to the upstream side of the needle valve 230 instead of to the downstream side and hence the pressure in the air line 228 forms the upstream pressure for both needle valves. As a consequence, the pressures in the capsules 231 and 232 will be identical if the needle valves 230 and 237 are adjusted to give identical time-constants. Consequently the arm 234 will not be displaced and the feed-back will eliminated. It is only possible to obtain the desired derivative and integral components with this alternative arrangement if the two time-constants are adjusted to appreciably different values. It is customary to adjust the time-constant associated with the needle valve 237 to a value at least four times that of the time-constant associated with the needle valve 230. Subject to this proviso, the pressure difference between the capsules 231 and 232 varies substantially in proportion to the deviation and the pressure in the air line 228 comprises the desired proportional, integral and derivative component. Interaction again restricts the ratio of the integral action time to the derivative action time and, together with the above-mentioned minimum value of the $T_I/T_D$ ratio, makes it impossible to obtain a value less than 6.

The values of $T_D$ required in either of the arrangements shown in Figure 5 give rise to difficulties similar to those described above in connection with the apparatus shown in Figure 1. Moreover, the inclusion of the pressure amplifier formed by capsule 225 and valves 226 and 227 increases the tendency to self-oscillation. With both arrangements these difficulties are overcome by operating the unit in conjunction with a pneumatic amplifier of the type shown in Figures 3 and 4, actuated by capsules 189, 190, 191 and 192, which allows the value of $T_D$ to be sufficiently reduced. Moreover the special time-constant difficulty described in connection with Figure 5(b) can also be overcome in this manner. As a result it becomes possible for the ratio of the integral action time to the derivative action time to be reduced to 4. A controller which exemplifies this combined arrangement is shown in Figures 6 and 7, which will now be described.

Referring to Figures 6 and 7, a compensated jet unit, of the type described in connection with Figures 3 and 4, formed by 173, 174, 175, 176, 177, 178, 179 and 212 is connected to the compressed air supply 262 by the air line 261. It is actuated by the pull-rod 180 which is connected to the arm 240 of a differential linkage of the type described in connection with Figure 5(a) consisting of 216, 221, 236, 239, 240 and 241. The link 239 is connected to the bell-crank 268, which is connected by the link 269 to a differential linkage 270 which moves the link 269 in proportion to the deviation of the variable from the desired value. The sensitive element is exemplified by the Bourdon tube 271 which is operated by the temperature-sensitive bulb 272. The mechanism 273 exemplifies the desired value adjustment.

The feed-back unit comprises the pressure-sensitive capsule 244 which is mounted inside the air-tight chamber 245. The response of the capsule 244 is transmitted by the rod 246 to one end of the arm 247 which is pivoted by the flexible diaphragm 276. The other end of the arm 247 is connected by the link 248 to the arm 249 which is pivoted at 255. The movement of the arm 249 is transmitted by the roller 274 to the arm 257 which is pivoted at 256, and is connected to the link 236. The assembly consisting of the pinion 254 engaging with the quadrant 252, which is pivoted at 253 and carries the pivot point 254 of the arm 250 on which is mounted the roller 274, exemplifies the customary arrangement for altering the feed-back ratio. By moving the roller 274 to the left, for instance, the feed-back ratio is increased and a greater deviation is required to effect a change in the proportional component, i. e. the value of $\mu$ is reduced.

The pressure in the air chamber 174 is connected by the air line 263 through the needle valve 259 and the air line 267 to the capsule 244 which actuates the negative feed-back. Accordingly, the needle valve 259 is the derivative needle valve. The air line 263 is also connected through the needle valve 258 to the air chamber 245. The pressure in the air chamber 245 opposes the pressure in the capsule 244 and so actuates the positive feed-back. Accordingly, the needle valve 258 is the integral needle valve. The pressure difference between the capsule 244 and the air chamber 245 varies in proportion to the deviation. The pressure in the air chamber 174 comprises the proportional, integral and derivative components.

A pneumatic amplifier of the type shown in Figures 3 and 4, consists of 186, 186a, 187, 188, 189, 190, 191, 192, 193, 194, 195, 196, 197, 198, 199, 200, 203a, 204, 205, 210, 213 and 215, but the construction 204a is replaced by the needle valve 242 which is connected to the capsule 190 by the air line 243. The capsule 191 is connected through the constriction 203a and the air line 264 to the air chamber 174. Consequently the pressure in the capsule 191 is substantially equal to the pressure in the air chamber 174. The capsule 192 is connected to the air line 275 and is accordingly subjected to the pressure in the capsule 244. It follows that the pressure difference between the capsules 191 and 192 is the same as the pressure difference across the derivative needle valve 259. The capsule 189 is connected by the air line 265 to the air line 275 and is accordingly also subjected to the pressure in the capsule 244. Accordingly, the pressure in the capsule 190 comprises a first pneumatic pressure which includes the algebraic sum of the pressure in the capsule 244 and an amplification of the pressure difference across the needle valve 259. In the example shown in Figures 6 and 7 the ratio of this amplification is 10 and, as the pressure difference across the needle valve 259 is proportionate to the associated time-constant $T_D$, this amplification makes it possible for given values of $\rho$, $\mu$ $\gamma$ to be obtained with the needle valve 259 adjusted to give time-constants which are one-tenth of the values required with the means shown in Figure 5(b) in respect of the needle valve 230. Moreover by adjusting the needle valve 259 to give time-constants having values which lie between one-tenth and one-fortieth of the value of the time-constant to which the needle valve 258 is adjusted, it is possible to obtain relationships between $\rho$, $\mu$ and $\gamma$ which are unobtainable with either of the arrangements shown in Figure 5 and which I have found to be desirable in many control applications.

If the needle valve 242 is adjusted to give a time-constant similar to that chosen for constriction 204a in Figures 3 and 4, the pressure in the air chamber 194 will be substantially equal to the pressure in the capsule 190 and can be employed to regulate a combined corrective restraint comprising proportional, integral and derivative components. If, on the other hand, the needle valve 242 is adjusted to give a time-constant of a much higher value, the pressure difference between the air chamber 194 and the capsule 190 will become appreciable. Moreover it will be proportionate to the rate of change of the pressure in the capsule 190 and will comprise three components, respectively proportionate to the rate of change of the three components of the pressure in the capsule 190. In respect of the derivative component of the pressure in the capsule 190, the corresponding component of the pressure difference across the needle valve 242 will be proportionate to the rate of change of the rate of change of the deviation, i. e. the 2nd time-differential of the deviation. This can be employed to regulate a "2nd derivative" form of corrective restraint. In respect of the other two components of the pressure in the capsule 190, the corresponding components of the pressure difference across the needle valve 242 will constitute additional derivative and proportional components. The air pressure in the air chamber 194, as a second pneumatic pressure, will then be equal to the algebraic sum of the pressure in the capsule 190 plus the pressure difference across the needle valve 242, and can accordingly be employed to regulate a combined corrective restraint comprising proportional, integral, 1st derivative and 2nd derivative components. I have found that the inclusion of the 2nd derivative component gives improved results in many control applications and that these improved results can be obtained by adjusting the needle valve 242 to give time-constants of similar values to those required in connection with needle valve 259. Consequently, the difficulties described in connection with Figure 1 are not reintroduced by the addition of the needle valve 242.

Should it be found necessary to increase the proportion of the 2nd derivative component for special control applications, it is within the scope of this invention to include a further amplifier of the type described, whereby a further pressure can be established which is proportionate to the algebraic sum of the pressure in the capsule 190 plus an amplification of the pressure difference across the needle valve 242. This further amplifier can be identical with that shown in Figures 3 and 4, in which case the pressure in the air chamber of the compensated jet unit will be substantially equal to the pressure in the follow-up capsule. This pressure can be employed to regulate the corrective restraint and the time-constant associated with the needle valve 242 can then be reduced in proportion to the amplification provided.

The compensated jet unit actuated by the pull rod 180 is capable of regulating the pressure in the air chamber 174 over the full range and thus avoids the need for a pressure amplifier. Nevertheless, it can be replaced by a small jet and flapper operated in conjunction with a pressure amplifier of the type exemplified in the means shown in Figure 5. Alternatively, the derivative component amplifier can be modified so as to superpose an overall amplification, i. e. to make the pressure in the capsule 190 a multiple of the algebraic sum of the pressure in the capsule 244 and an amplification of the pressure difference across the needle valve 259. For instance, the pressure in the capsule 190 could be regulated so that it was equal to five times the pressure in the capsule 244 and fifty times the pressure difference across the needle valve 259. This can be achieved, for example, by replacing capsule 190 by a capsule which exerts an effort per unit pressure which is one-fifth of the effort exerted by capsule 189 per unit pressure.

As various embodiments may be made of the above invention and as changes might be made in the embodiment above set forth, it is to be understood that all matter hereinbefore set forth or shown in the accompanying drawings is to be interpreted as illustrative and not in a limiting sense.

What I claim is:

1. In control apparatus that includes means for imposing a corrective restraint on a variable condition in relation to the detected deviation of said variable condition from a datum value, means to detect continuously a deviation of said variable condition and to establish a first response related to said deviation, and means to detect continuously the rate of change of said deviation and to establish a second response related to said rate of change; the improvement that comprises means to amplify discriminatingly said second response and to modulate said means for imposing a corrective restraint substantially in proportion to the algebraic sum of said first response and said amplified second response.

2. In control apparatus that includes means for imposing a corrective restraint on a variable condition in relation to the detected deviation of said variable condition from a datum value, means to detect continuously a deviation of said variable condition and to establish a first response related to said deviation, and means to detect continuously the rate of change of said deviation and to establish a second response related to said rate of change; the improvement that comprises means to amplify discriminatingly said second response and means for modulating said means for imposing a corrective restraint substantially in proportion to the algebraic sum of said first response and said amplified second response.

3. In control apparatus that includes means for imposing a corrective restraint on a variable condition in relation to the detected deviation of said variable condition from a datum value, means to detect continuously a deviation of said variable and to establish a first response related to said deviation, and means to detect continuously the rate of change of said deviation and to establish a second response related to said rate of change; the improvement that comprises fluid pressure means to amplify discriminatingly said second response and to modulate said means for imposing a corrective restraint substantially in proportion to the algebraic sum of said first response and said amplified second response.

4. In control apparatus that includes means for imposing a corrective restraint on a variable condition in relation to the detected deviation of said variable condition from a datum value, means to detect continuously a deviation of said variable and to establish a first response related to said deviation, and means to detect continuously the rate of change of said deviation and to establish a second response related to said rate of change; the improvement that comprises pneumatic pressure means to amplify discriminatingly said second response and to modulate said means for imposing a corrective restraint substantially in proportion to the algebric sum of said first response and said amplified second response.

5. In control apparatus that includes means for imposing a corrective restraint on a variable condition in relation to the detected deviation of said variable condition from a datum value, means to detect continuously a deviation of said variable and to establish a first response related to said deviation, and means to detect continuously the rate of change of said deviation and to establish a second response related to said rate of change; the improvement that comprises valve means for regulating a pneumatic pressure, and motor means operating said value means, said motor means being proportionately responsive to said first response and said second response and having a proportionality ratio to said second response that is greater than the proportionality ratio to said first response whereby to operate said valve means to vary said pneumatic pressure in proportion to the algebraic sum of said first response and an amplification of said second response, said pneumatic pressure being employed to modulate said means for imposing a corrective restraint.

6. In control apparatus that includes means for imposing a corrective restraint on a variable condition in relation to the detected deviation of said variable condition from a datum value, means to detect continuously a deviation of said variable and to establish a first response related to said deviation, and means to detect continuously the rate of change of said deviation and to establish a second response related to said rate of change; the improvement that comprises valve means for regulating a pneumatic pressure, and motor means operating said valve means, said motor means being proportionately responsive to said first response and said second response and having a proportionality ratio to said second response that is greater than the proportionality ratio to said first response whereby to operate said valve means to vary said pneumatic pressure in proportion to the algebraic sum of said first response and an amplification of said second response, follow-up means being responsive to said pneumatic pressure arranged in conjunction with said motor means, said pneumatic pressure being employed to modulate said means for imposing a corrective restraint.

7. In control apparatus that includes means for imposing a corrective restraint on a variable condition in relation to the detected deviation of said variable condition from a datum value, means to detect continuously a deviation of said variable and to establish a first response related to said deviation, and means to detect continuously the rate of change of said deviation and to establish a second response related to said rate of change; the improvement that comprises valve means for regulating a first pneumatic pressure, motor means operating said valve means, said motor means being proportionately responsive to said first response and said second response and having a proportionality ratio to said second response that is greater than the proportionality ratio to said first response whereby to operate said valve means to vary said first pneumatic pressure in proportion to the algebraic sum of said first response and an amplification of said second response, follow-up means arranged in conjunction with said motor means and being proportionately responsive to a second pneumatic pressure, and means to derive said second pneumatic pressure from said first pneumatic pressure including means to create a pressure difference between said first and second pressures that varies proportionately to the rate of change of said second pneumatic pressure, said second pneumatic pressure being employed to modulate said means for imposing a corrective restraint.

8. In control apparatus that includes means for imposing a corrective restraint on a variable condition in relation to the detected deviation of said variable condition from a datum value, means to detect continuously a deviation of said variable and to establish a first response pressure related to said deviation, and means to detect continuously the rate of change of said deviation and to establish a pressure difference related to said rate of change; the improvement that comprises valve means for regulating a pneumatic pressure which includes the sum of said first response and said pressure difference, and motor means operating said valve means, said motor means being proportionately responsive to said first response and said pressure difference and having a proportionality ratio to said pressure difference that is greater than the proportionality ratio to said first response whereby to operate said valve means to vary said pneumatic pressure in proportion to the algebraic sum of said first response and an amplification of said pressure difference, said pneumatic pressure being employed to modulate said means for imposing a corrective restraint.

9. In control apparatus that includes means for imposing a corrective restraint on a variable condition in relation to the detected deviation of said variable condition from a datum value, means to detect continuously a deviation of said variable and to establish a first response related to said deviation, and means to detect continuously the rate of change of said variable and to establish a pressure difference related to said rate of change; the improvement that comprises valve means for regulating a first pneumatic pressure which includes as components said first response and said pressure difference, motor means operating said valve means, said motor means being proportionately responsive to said first response and said pressure difference and having a proportionality ratio to said pressure difference that is greater than the proportionality ratio to said first response whereby to operate said valve means to vary said first pneumatic pressure in proportion to the combined effect of said first response and an amplification of said pressure difference, and follow-up means proportionately responsive to said first pneumatic pressure arranged in conjunction with and responsive to said motor means, said first pneumatic pressure being employed to modulate said means for imposing a corrective restraint.

10. In control apparatus that includes means for imposing a corrective restraint on a variable condition in relation to the detected deviation of said variable condition from a datum value, means to detect continuously a deviation of said variable and to establish a first response related to said deviation, and means to detect continuously the rate of change of said deviation and to establish a pressure difference related to said rate of change; the improvement that comprises valve means for regulating a first pneumatic pressure, motor means operating said valve means, said motor means being proportionately responsive to both said first response and said pressure difference and having the greater proportionality ratio to said pressure difference, whereby to operate said valve means to vary said first pneumatic pressure in proportion to the algebraic sum of said first response and an amplification of said pressure difference, follow-up means responsive to said motor means and being proportionately responsive to a second pneumatic pressure, and means to derive said last mentioned pneumatic pressure from said first pneumatic pressure including means to create a pressure difference between said first pneumatic pressure and said second pneumatic pressure that varies proportionately to the rate of change thereof, said second pneumatic pressure being employed to modulate said means for imposing a corrective restraint.

11. In control apparatus that includes means for imposing a corrective restraint on a variable condition in relation to the detected deviation of said variable condition from a datum value, means to detect continuously a deviation of said variable and to establish a pneumatic pressure having a first component which is substantially proportionately related to said deviation and a second component which is substantially proportionately related to the time-integral of said deviation, and means to detect continuously the rate of change of said first pneumatic pressure and establish a pneumatic pressure difference related to said rate of change; the improvement that comprises valve means for regulating a different pneumatic pressure, and motor means operating said valve means, said motor means being proportionately responsive to said pneumatic pressure as well as to said pressure difference and having a greater proportionality ratio to said pressure difference, whereby to operate said valve means to vary said different pneumatic pressure in proportion to the combined effect of the pneumatic pressure proportionally related to said deviation and an amplification of said pressure difference, said different pneumatic pressure being employed to modulate said means for imposing a corrective restraint.

12. In control apparatus that includes means for imposing a corrective restraint on a variable condition in relation to the detected deviation of said variable condition from a datum value, means to detect continuously a deviation of said variable and to establish a pneumatic pressure having a first component which is substantially proportionately related to said deviation and a second component which is substantially proportionately related to the time-integral of said deviation, and means to detect continuously the rate of change of said pneumatic pressure and establish a pneumatic pressure difference related to said rate of change; the improvement that comprises valve means for regulating a different pneumatic pressure, motor means operating said valve means, said motor means being proportionately responsive both to said pneumatic pressure and said pressure difference and having the larger proportionality ratio to said pressure difference, whereby to operate said valve means to vary said different pneumatic pressure in proportion to the algebraic sum of said pneumatic pressure and an amplification of said pressure difference, and follow-up means proportionately responsive to said different pneumatic pressure arranged in conjunction with said motor means, said different pneumatic pressure being employed to modulate said means for imposing a corrective restraint.

13. In control apparatus that includes means for imposing a corrective restraint on a variable condition in relation to the detected deviation of said variable condition from a datum value, means to detect continuously a deviation of said variable and to establish a pneumatic pressure having a first component which is substantially proportionately related to said deviation and a second component which is substantially proportionately related to the time-integral of said deviation, and means to detect continuously the rate of change of said pneumatic pressure and to establish a pneumatic pressure difference related to said rate of change; the improvement that comprises valve means for regulating a different pneumatic pressure, motor means operating said valve means, said motor means being proportionately responsive both to said pneumatic pressure and said pressure difference and having the greater proportionality ratio to said pressure difference, whereby to operate said valve means to vary said different pneumatic pressure in proportion to the algebraic sum of said pneumatic pressure and an amplification of said pressure difference, follow-up means arranged in conjunction with said motor means and being proportionately responsive to another pneumatic pressure, and means to derive said last mentioned pneumatic pressure from said different pneumatic pressure including means to create a pressure difference between said different pneumatic pressure and said other pneumatic pressure that varies proportionately to the rate of change of said other pneumatic pressure, said different pneumatic pressure being employed to modulate said means for imposing a corrective restraint.

References Cited in the file of this patent

UNITED STATES PATENTS

| | | |
|---|---|---|
| 2,016,824 | Smith | Oct. 8, 1935 |
| 2,476,104 | Mason | July 12, 1949 |

FOREIGN PATENTS

| | | |
|---|---|---|
| 536,537 | Great Britain | May 19, 1941 |
| 568,634 | Great Britain | Apr. 13, 1945 |